PREPARATION OF THE NITRIDES OF ALUMINUM AND GALLIUM

Arrigo Addamiano, Willoughby, Ohio, assignor to General Electric Company, a corporation of New York
No Drawing. Filed May 1, 1961, Ser. No. 106,482
12 Claims. (Cl. 23—191)

This invention relates to the preparation of the nitrides of trivalent metals and particularly to the nitrides of aluminum and gallium. Aluminum and gallium nitride are known to exhibit high chemical stability, high-resistance to oxidation, high melting points and high hardness. In the pure state they are good electrical insulators, yet if properly doped they behave as semiconductors and can be used as rectifiers, luminescent and electroluminescent materials, photoconductors and the like.

It is therefore an object of this invention to provide a method of preparation of the nitrides of aluminum and gallium which readily yields these compounds with a high degree of purity and high yields of reaction. Another object of this invention is to provide a method of preparation of the nitrides of aluminum and gallium relatively free of dangers, that is relatively low temperature method involving only simple operations, which can be performed at atmospheric pressure. Another object of this invention is to provide a method of preparation of the nitrides of aluminum and gallium which is suitable for the production of industrial quantities of the nitrides as well as for the preparation of laboratory amounts of these nitrides.

Technical grade aluminum nitride has long been prepared by the Serpek process from aluminum oxide, carbon and nitrogen in the following high temperature (1800–1900° C.) reaction:

$$Al_2O_3 + 3C + N_2 \rightarrow 3CO + 2AlN$$

The compound was also prepared by direct synthesis from the elements, e.g. heating aluminum in nitrogen at 1000° followed by pulverization of the product obtained and repeated heat treatment, or by reacting molten aluminum with nitrogen under a pressure of 700 p.s.i. at 1600° C. Aluminum nitride prepared by these and other prior methods has been described as being yellow, bluish, greyish black, honey yellow or almost colorless indicating that impurities were generally present. Similar prior attempts at preparing gallium nitride from the metal resulted in relatively impure products.

In accordance with the objects of the present invention it has been found that by reaction between anhydrous gaseous ammonia ($NH_3$) and aluminum phosphide (AlP), gallium phosphide (GaP) and gallium arsenide (GaAs) at 700–1200° C. circa, these compounds are quantitatively transformed into the nitrides, while volatile phosphorus and arsenic are evolved. The reactions may be written as follows:

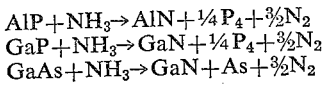

The starting compounds are first milled to a fine powder (200 mesh or smaller) taking care to avoid exposure to moist air, which would result in a partial hydrolysis of the powders. The fine powders are then placed in silica boats (or, if preferred, in boats of spectroscopically pure graphite or other suitable material), the boats are introduced into a tubular furnace and the air is displaced by a slow steady flow of dry ammonia. When all the air is displaced the temperature is raised, always keeping the ammonia flowing through the furnace. The onset of the reactions is easily detected, due to the formation of volatile phosphorus or arsenic vapors, which condense downstream towards the end of the furnace or out of it. While the reactions begin in every case below 1000° C. it is convenient to raise the temperature to 1000–1200° C. in order to increase the rate of reaction and to facilitate the crystallization of the powders obtained, so as to increase their stability towards attack by moisture or other atmospheric agents.

When the evolution of phosphorus or arsenic vapors ends the reactions are over. However it is convenient to continue the firing process for some time (one hour to a few hours) to help eliminate any residual trace of phosphorus or arsenic and to favor the recrystallization of the product obtained, as stated above. Practically it has been found convenient to increase the temperature at the end of the reactions to approximately 1200° C. for a few hours and then to cool the furnace while keeping the ammonia flowing in order to eliminate any chance of thermal dissociation of the products obtained, and in particular of the nitride of gallium, which readily decomposes at about 1250° C.

In the preparation of aluminum nitride from aluminum phosphide by the instant method, it is found that the reaction begins at about 900° C. At this temperature, however, the rate of reaction is low, thus it is more convenient to operate at 1000°–1200° C. and the reaction is complete in about two hours. To insure a suitable crystallization of the product, the firing is continued for approximately one hour longer and then the furnace is cooled overnight while maintaining a flow of ammonia thereover.

*Example 1.*—Aluminum phosphide (0.7 g.) in the form of a fine powder (200 mesh or finer) was placed in a fused silica boat in a tubular furnace. A stream of purified dry ammonia flowing at a velocity of 0.6 liter per minute was used to displace the air. The temperature was then gradually raised to 1100° C. and reaction allowed for six hours. Phosphorous evolved in the reaction sublimed and condensed downstream outside the furnace. At the end of this period, there was no more phosphorus evolution and the product was entirely transformed into AlN. The temperature was then raised to 1200° C. for one hour to insure proper crystallization of the AlN. After overnight cooling in an $NH_3$ stream, the boat was extracted and 0.5 gram of product was obtained which corresponds to a quantitative yield of AlN. The product obtained showed a complete discoloration with an off-white, slightly greyish color. X-ray analysis showed the complete disappearance of the AlP pattern and presence of the full AlN pattern. No lines due to impurities or other compounds were present in the X-ray pattern. To further check the chemical properties, the product was tested with hot and cold $H_2SO_4$, $HNO_3$, HCl and NaOH and no dissolution occurred.

In the preparation of gallium nitride from gallium phosphide, it was found that the reaction with $NH_3$ begins to be fast at about 930° C. and the reaction is complete after approximately two hours firing at 1000–1100° C. To insure proper crystallization of the product obtained, the temperature is raised for approximately one hour at about 1100° C. in an ammonia stream and then the furnace is cooled overnight keeping the ammonia stream. Since GaN dissociates readily into gallium metal and nitrogen at temperatures of about 1250° C. or higher in a neutral atmosphere, the maintenance of the ammonia stream is highly critical.

*Example 2.*—An ingot of gallium phosphide was crushed and milled to get a fine powder (200 mesh or finer). The powder (0.63 g.) was placed in a silica boat and set in a tubular furnace. A stream of purified dry ammonia flowing at approximately 0.6 liter/min. was used to displace the air and the temperature was gradually raised to 1100° C. and maintained for about two hours.

The firing was continued in an NH₃ stream at about 1100° C. overnight to insure proper crystallization of the product. The product was then cooled in an ammonia stream, the boat extracted and 0.5 g. yield was obtained, which corresponds to a quantitative yield for GaN. The product was a white powder with a slight yellow tinge. It was chemically stable towards acids and bases and the X-ray pattern showed all the lines belonging to the GaN pattern.

The preparation of gallium nitride from gallium arsenide was found to be similar to that from gallium phosphide as given above except that the reaction is carried out at approximately 1000° C. so that the reaction will be complete in about two hours. Again it is found to be important that during the crystallization and cooling time an ammonia stream be flowed over the product so that the GaN does not dissociate into gallium metal and nitrogen.

*Example 3.*—Gallium arsenide (8.8 g.) in fine powder form was placed in a silica boat and set in a tubular furnace. Ammonia gas flowing at approximately 0.6 liter per minute was used to displace the air and the furnace heated to about 1000° C. After one and a half hours, the reaction was complete and the product was then fired at a slightly higher temperature to promote crystallization. Then the product was cooled while the flow of ammonia was continued. 5.1 g. of product was obtained which again is a quantitative yield for GaN. This product was identical in its physical and chemical properties to that obtained as described in Example 2.

To cut down the reaction time any of the above reactions may be done using a fluid bed technique. In such method the starting materials are placed on a quartz frit of sufficient porosity to be permeable to the ammonia and the ammonia is flowed upwards at the temperatures stated above. Using this technique the reaction time is greatly reduced.

While the above examples are limited to the phosphide of aluminum, and the phosphide and arsenide of gallium, it is clear to those skilled in the art that other products could be used. For instance aluminum arsenide or gallium antimonide could be used as starting materials. Similarly boron phosphide or arsenide would react to give boron nitride. Therefore the method just described is not limited in his applications to the specific materials used to illustrate the process.

From the above certain commercial advantages are readily apparent. Since relatively low temperatures are used commercial equipment for carrying the processes is readily available. Moreover since the reactions occur at atmospheric pressure costly and somewhat dangerous high pressure operations are avoided. Moreover the method is not limited to laboratory scale production of the nitrides of aluminum and gallium but can easily be applied to the production of these materials on an industrial scale.

A further application of the process which is interesting from the standpoint of semiconductor devices is that it affords a method to generate a layer of aluminum or gallium nitride on the surface of single crystals AlP, GaP or GaAs. This layer can be produced by reaction of ammonia at the surface of single crystals of the above mentioned materials. Because of the relatively high bandgap of AlN ($>5$ e.v.) and GaN (3.2 e.v.) as compared to AlP (2.4 e.v.), GaP (2.2 e.v.) and GaAs (1.43 e.v.) the properties of these layers in contact with the bulk of the original material (AlP, GaP and GaAs) can be expected to be quite interesting, and be useful, for instance, in crystal rectifiers and p-n junctions and in particular p-n electroluminescent junctions.

Although the preferred processes of the invention have been described by way of example and teaching, many modifications may occur to those skilled in the art. It should be understood that the appended claims are intended to cover all such modifications as fall within the true spirit and scope of the invention.

What I claim as new and desire to secure by Letters Patent of the United States is:

1. A method of preparing aluminum and gallium nitrides comprising the steps of reacting a powder selected from the class consisting of the phosphide and arsenide of aluminum and gallium with anhydrous ammonia gas at a temperature between approximately 700° and 1200° C., then firing the resultant product in an atmosphere consisting essentially of anhydrous ammonia gas at approximately 1200° C. to promote crystallization and then cooling the resultant product.

2. A method of preparing aluminum nitride comprising the steps of reacting aluminum phosphide powder with anhydrous ammonia gas at a temperature between approximately 900° and 1200° C. for a length of time sufficient to convert all or part of the aluminum phosphide to aluminum nitride and then cooling the resultant product.

3. A method of preparing gallium nitride comprising the steps of reacting gallium phosphide powder with anhydrous ammonia gas at a temperature between approximately 930° and 1200° C. for a length of time sufficient to convert all or part of the gallium phosphide to gallium nitride and then cooling the resultant product.

4. A method of preparing gallium nitride comprising the steps of reacting gallium arsenide powder with anhydrous ammonia gas at a temperature between approximately 700° and 1200° C. for a length of time sufficient to convert all or part of the gallium arsenide to gallium nitride and then cooling the resultant product.

5. A method of preparing nitrides comprising the steps of reacting a powder selected from the class consisting of the phosphide and arsenide of aluminum and gallium with anhydrous ammonia gas at a temperature of approximately 1000° C., then firing the resultant product in an atmosphere consisting essentially of anhydrous ammonia gas at a temperature between 1000° and 1200° C. to promote crystallization and then cooling the resultant product.

6. A method of preparing nitrides comprising the steps of reacting a fine powder selected from the class consisting of the phosphide and arsenide of aluminum and gallium with anhydrous ammonia gas at a temperature between approximately 700° and 1200° C., then firing the resultant product in an atmosphere consisting essentially of anhydrous ammonia gas at a temperature between 1000° and 1200° C. to promote crystallization and then cooling the resultant product.

7. A method of preparing nitrides comprising the steps of reacting a fine powder selected from the class consisting of the phosphide and arsenide of aluminum and gallium with anhydrous ammonia gas at a temperature between approximately 700° and 1200° C., then firing the resultant product in an atmosphere consisting essentially of anhydrous ammonia gas at a temperature between 1000° and 1200° C. to promote crystallization and then cooling the resultant product in the presence of anhydrous ammonia gas to prevent dissociation of said resultant product.

8. A method of preparing aluminum nitride comprising the steps of reacting fine aluminum phosphide powder with anhydrous ammonia gas at approximately 1000° C., firing the resultant product in an atmosphere consisting essentially of anhydrous ammonia gas at approximately 1200° C. to promote crystallization and cooling the resultant product in the presence of anhydrous ammonia gas to prevent dissociation of said resultant product.

9. A method of preparing gallium nitride comprising the steps of reacting fine gallium phosphide powder with anhydrous ammonia gas at approximately 1000° C., firing the resultant product in an atmosphere consisting essentially of anhydrous ammonia gas at approximately 1200° C. to promote crystallization and cooling the resultant product in the presence of anhydrous ammonia gas to prevent dissociation of said resultant product.

10. A method of preparing gallium nitride comprising the steps of reacting fine gallium arsenide powder with anhydrous ammonia gas at approximately 1000° C., firing the resultant product in an atmosphere consisting essentially of anhydrous ammonia gas at approximately 1200° C. to promote crystallization and cooling the resultant product in the presence of anhydrous ammonia gas to prevent dissociation of said resultant product.

11. A method of preparing aluminum nitride layers on the surface of single crystals of aluminum phosphide comprising the steps of reacting said single crystals with anhydrous ammonia gas at a temperature between approximately 700° and 1200° C., for a length of time sufficient to form a layer of nitride on said crystal.

12. A method of preparing gallium nitride layer on the surface of a single crystal of the class consisting of gallium phosphide and gallium arsenide comprising the steps of reacting a single crystal with anhydrous ammonia at a temperature between approximately 700° and 1200° C. for a length of time sufficient to form a layer of nitride on said crystal.

References Cited in the file of this patent

UNITED STATES PATENTS

| | | |
|---|---|---|
| 2,750,268 | Erasmus et al. | June 12, 1956 |
| 2,929,126 | Bollack et al. | Mar. 22, 1960 |
| 3,021,196 | Merkel | Feb. 13, 1962 |

OTHER REFERENCES

Mellor: Comprehensive Treatise on Inorganic and Theoretical Chemistry, vol. VIII, Longmans, Green and Company, New York (1928), pages 112, 113, 841, 845, 850.

Van Wazer: Phosphorus and Lts. Compounds, vol 1, pages 147, 148 (1958), Interscience Publishers Inc., New York.